United States Patent [19]

Chujo et al.

[11] Patent Number: 5,168,687
[45] Date of Patent: Dec. 8, 1992

[54] APPARATUS FOR INTERPOSING SPACERS BETWEEN ADJACENT PLATES

[75] Inventors: Yoshimasa Chujo; Hayato Miura, both of Mie, Japan

[73] Assignee: Central Glass Company, Limited, Ube, Japan

[21] Appl. No.: 733,189

[22] Filed: Jul. 19, 1991

[30] Foreign Application Priority Data

Jul. 20, 1990 [JP] Japan .................................. 2-77337

[51] Int. Cl.⁵ ...................... B65G 57/04; B65B 23/20
[52] U.S. Cl. ...................................... 53/445; 53/157; 53/542
[58] Field of Search ............... 53/445, 443, 435, 472, 53/157, 156, 542, 522, 520

[56] References Cited

U.S. PATENT DOCUMENTS

| 2,164,077 | 6/1939 | Owen | 53/157 X |
| 2,635,965 | 4/1953 | Hensgen et al. | 53/157 X |
| 3,693,321 | 9/1972 | Nilsson | 53/157 X |
| 3,832,823 | 9/1974 | Currie | 53/157 X |
| 4,079,645 | 3/1978 | Nunes | 53/157 X |
| 4,292,785 | 10/1981 | Hammond | 53/542 X |

FOREIGN PATENT DOCUMENTS 58-73516  5/1983  Japan .
58-149281 9/1983  Japan .

Primary Examiner—James F. Coan
Attorney, Agent, or Firm—Keck, Mahin & Cate

[57] ABSTRACT

An apparatus includes a frame for receiving a pallet therein. A supporting member is operatively connected to the frame so as to be horizontally slidable in a fore-and-aft direction with respect to the frame. The supporting member is positioned at a level which is higher than the plates which are generally vertically stood on the pallet. A plurality of vertical elongate members are secured to the supporting member so as to be horizontally slidable along a major surface of the supporting member in a lateral direction. Each elongate member is vertically telescopic and has a axially extending opening formed therein in which the spacer can be received. A pair of rollers are rotatably mounted on a top of each elongate member for guiding the spacer into the opening and lowering the spacer to a first position adjacent a major surface of a first plate which is generally vertically stood on the pallet. A robotic arm places a second plate on the pallet and moves the second plate to a second position with respect to the first plate wherein the spacer is sandwiched between the first and second plates. A cutting device is secured to a lower end of each elongate member for cutting the spacer.

14 Claims, 3 Drawing Sheets

APPARATUS FOR INTERPOSING SPACERS BETWEEN ADJACENT PLATES

BACKGROUND OF THE INVENTION

1. Field of the Invention

The present invention relates in general to an apparatus for interposing spacers between adjacent plates of a plurality of plates, and more particularly to an apparatus for interposing spacers of tapelike shape between adjacent glass plates of a plurality of glass plates which are to be vertically stood in a pallet.

2. Description of the Prior Art

A plurality of glass plates are vertically stood in a pallet for their transport in a factory or for their shipment. Hitherto, various materials have been proposed to be interposed between adjacent glass plates to prevent those plates from rubbing against each other. Sheet paper and certain types of powder are examples of those materials.

Japanese Patent First Provisional Publication 58-73516 discloses an apparatus for interposing a thread between adjacent glass plates of a plurality of plates. The apparatus has a plurality of bars which are positioned above top surfaces of the glass plates which are to be vertically stood in a pallet. The bars are horizontally in alignment at certain intervals therebetween along major surfaces of the glass plates, each of which is perpendicular to the major surfaces of the glass plates. The bars are horizontally slidable in a direction perpendicular to the major surfaces of the glass plates. To interpose the thread between adjacent glass plates, the bars are slid to a first predetermined position relative to a first glass plate stood in the pallet. Then, the thread is hung on the bars so as to form a U-shape between every adjoining bars. With this, the thread becomes in abutment with a front major surface of the first glass plate. Then, a second glass plate is moved from the front toward the first glass plate so as to mate with the first glass plate and to interpose and tightly hold the thread therebetween. Then, the bars are moved forward to a second predetermined position to hang the thread thereon again. With this, the thread slips out of the bars. This operation is continued until the thread is interposed between adjacent glass plates.

Japanese Patent First Provisional Publication 58-149281 discloses a method for interposing a thread between adjacent glass plates. In this method, the thread is hung on a plurality of bars which are similar to those of the apparatus of the above-mentioned Publication 58-73516. Furthermore, in this method, the thread is interposed between adjacent glass plates in such a manner that the thread protrudes from both mated side edges of the adjoining glass plates. Therefore, it is ensured to prevent the adjacent glass plates from rubbing at both side end portions thereof against each other. Thus, this method is applicable to interpose the thread between adjacent glass plates which are curved at both side end portions thereof.

However, the above-mentioned materials to be interposed between adjacent glass plates have respectively drawbacks as follows.

When the aforementioned sheet paper is used according to conventional interposing methods, it is necessary to use sheets of paper which are slightly larger in size than the glass plate. Therefore, an apparatus for interposing the paper between adjacent glass plates becomes relatively large in size, thereby increasing the production cost. Furthermore, it takes time to remove such large sized sheets of paper.

When the aforementioned powder is used for an interposal between every adjoining glass plates, it is necessary to have an extra process to wash out the powder before the heat treatment, thereby increasing the production cost and the amount of time for the production.

When the aforementioned thread is used as is described in the Publications 58-73516 and 58-149281, it takes much time to hang the thread on the bars and to remove the thread. Furthermore, the thread tends to get tangled or to slip out of the bars before interposed between the adjacent glass plates.

SUMMARY OF THE INVENTION

It is therefore an object of the present invention to provide an apparatus for interposing spacers between adjacent glass plates, which is free of the above-mentioned drawbacks.

According to the first aspect of the present invention, there is provided an apparatus for interposing a spacer between adjacent plates of a plurality of plates which are to be generally vertically stood on a pallet so as to be horizontally in alignment in a predetermined direction, the apparatus including: a frame which receives the pallet therein; a supporting member which is operatively connected to the frame so as to be horizontally slidable in the predetermined direction with respect to the frame, the supporting member being positioned at a level which is higher than the plates which are generally vertically stood on the pallet; an essentially vertical elongate member connected to the supporting member, the elongate member having a first axially extending opening formed therein in which the spacer can be received; first means for guiding the spacer into the first opening and lowering the spacer to a position adjacent a major surface of a first plate which is generally vertically stood on the pallet, the first means being mounted on a top of the elongate member; second means for placing a second plate on the pallet and moving the second plate to a first predetermined position with respect to the first plate wherein the spacer is sandwiched between the first and second plates; and third means for cutting the spacer, the third means being secured to a lower end of the elongate member.

According to the second aspect of the present invention, there is provided a method for interposing a spacer between adjacent plates of a plurality of plates which are to be generally vertically stood on a pallet so as to be horizontally in alignment in a predetermined direction, the method including the following steps in the sequence set forth: (1) placing a first plate on the pallet and vertically standing the same on the pallet; (2) placing the spacer at a first position above a top of the first plate; (3) lowering the spacer from the first position to a position adjacent a major surface of the first plate; (4) placing a second plate on the pallet and moving the second plate to a second position with respect to the first plate wherein the spacer is sandwiched between the first and second plates; and (5) cutting the spacer at a position above the top of the first plate.

DETAILED DESCRIPTION OF THE INVENTION

Referring to FIGS. 1 to 8, there is shown an apparatus of the present invention. As will be clarified as the description proceeds, the apparatus is used for interposing spacers 10 between adjacent glass plates 12 of a plurality of plates 12 which are to be generally vertically stood in a pallet 14.

Figure 1:
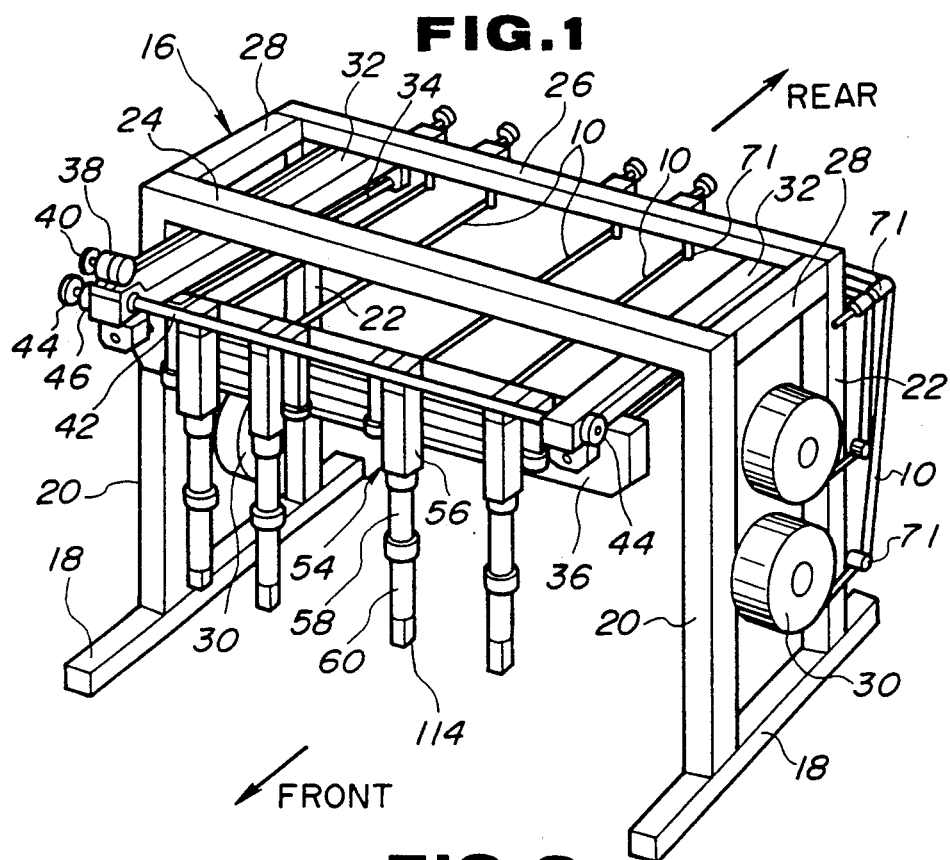
FIG. 1 is a perspective view of an apparatus according to the invention.

As is seen from FIG. 1, the apparatus has a rectangular frame 16. The rectangular frame 16 is formed with two base portions 18 which are placed on a floor (not shown), two front and two rear pillar portions 20 and 22 which are secured to the base portions 18, front and rear beam portions 24 and 26 which are respectively secured to upper end portions of the front pillar portions 20 and upper end portions of the rear pillar portions 22 and side beam portions 28 each of which is secured to upper end portions of the front and rear pillar portions 20 and 22.

The apparatus has four reels 30 which are rotatably secured to the front and rear pillar portions 20 and 22 of the frame 16 for winding the spacer 10 thereon, the spacer 10 being tapelike in shape.

Two elongate supporting members 32 are secured to bottom surfaces of the front and rear beam portions 24 and 26 of the frame 16 and positioned beside inner vertical surfaces of the front and rear pillars 20 and 22 of the frame 16. Each supporting member 32 has its rear end portion secured to the rear beam portion 26 and its front portion projecting forwardly from the front beam portion 24 and the front pillar portions 20.

As is clearly seen from FIGS. 2 and 3, two shafts 34 are respectively positioned below and along the supporting members 32 and secured at front and rear end portions thereof to bottom surfaces of the supporting members 32.

A supporting plate 36 is positioned parallel to the front and rear beam portions 24 and 26 of the frame 16 and has at its side end portions two circular openings (no numerals) through which the shafts 34 pass in such a manner that the supporting plate 36 is slidable from rear end portions of the shafts 34 to front end portions of the same.

To slide the supporting plate 36, there is provided a step motor 38 mounted on a front end portion of one of the supporting members 32. The step motor 38 has a drive shaft (no numeral) which is outwardly extended therefrom and has at its end a pulley 40.

A rod 42 is positioned parallel to the supporting plate 36 and rotatably held at its side portions by front end portions of the supporting members 32. The rod 42 has at its both side ends two front timing-belt pulleys 44 and at a position below the pulley 40 a pulley 46 (see FIG. 2). The pulley 40 is connected to the pulley 46 through a belt 48 so as to be rotatable therewith.

Figure 4:
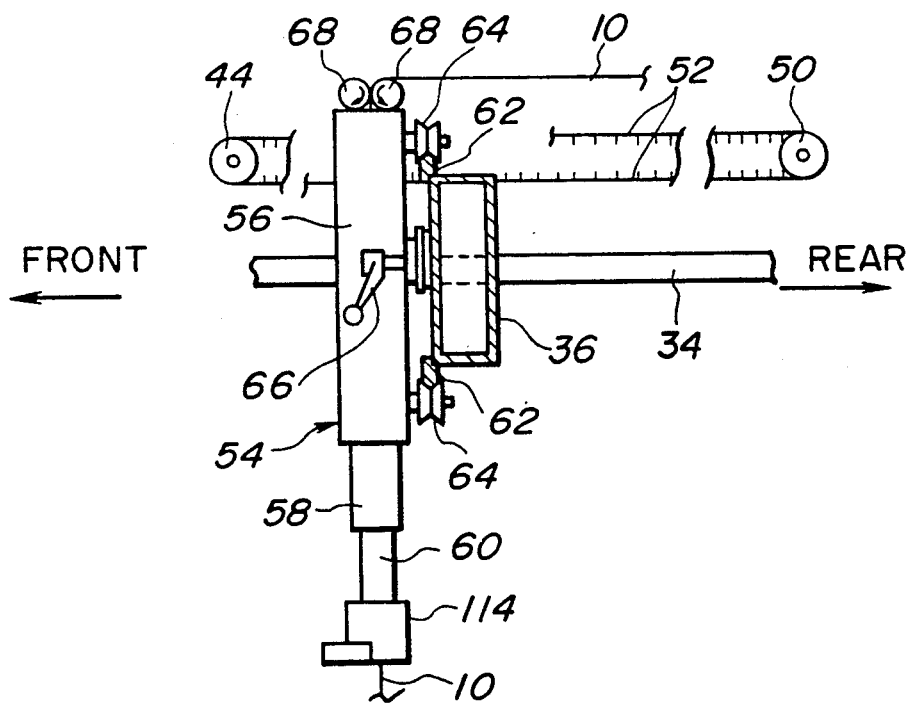
FIG. 4 is a side elevational, but partially cut away view of an essential part of the apparatus of FIG. 1.

Two rear timing-belt pulleys 50 are respectively rotatably secured to rear end portions of an outside vertical surfaces of the supporting members 32 and horizontally in alignment with the front timing-belt pulleys 44 (see FIG. 4). Each front timing-belt pulley 44 is connected to the corresponding rear timing-belt pulley 50 through an endless timing belt 52.

As is seen from FIG. 4, the supporting plate 36 is secured at side portions of a top surface thereof to the timing belt 52. Therefore, when the step motor 38 is energized to give its drive shaft a clockwise rotation viewed from the step motor 38, the power of the drive shaft is transmitted through the pulleys 40 and 46, the rod 42 and the front timing-belt pulleys 44 to the timing-belts 52 thereby moving the supporting plate 36 forwardly. On the other hand, when the drive shaft is given a counterclockwise rotation viewed from the step motor 38, the supporting plate 36 is moved rearwardly.

Four vertical elongate members 54 are positioned ahead of the supporting plate 36 and in alignment along the supporting plate 36. Each elongate member 54 has an upper hollow portion 56 which is prismatic in shape at its major portion and cylindrical in shape at its lower end portion and has a cylindrical through opening 55 extending from its upper end to its lower end, a middle hollow cylindrical portion 58 which is received in the cylindrical opening 55 of the upper hollow portion 56 so as to be vertically slidable therein and has a cylindrical through opening 57 and a lower cylindrical portion 60 which is received in the cylindrical opening 57 of the middle cylindrical portion 58 so as to be vertically slidable therein (see FIG. 6). The supporting plate 36 has two rails 62 at front end portions of the top and bottom surfaces thereof, respectively. Two wheels 64 are rotatably secured to a rear portion of the upper hollow portion 56 and vertically in alignment with each other. The two wheels 64 are so spaced away from each other as to laterally slidably engage with the rails 62. Therefore, each elongate member 54 is slidable in a lateral direction relative to the supporting plate 36.

A fixing device 66 is provided at a side surface of each upper hollow portion 56 and has a known mechanism for fixing the elongate member 54 at a desired position relative to the supporting plate 36.

As is seen from FIG. 4, a pair of front and rear rollers 68 coated with elastic members (not shown) are rotatably mounted on a top surface of each elongate member 54. The front and rear rollers 68 are horizontally in alignment with each other and so spaced as to interpose the spacer 10 therebetween. A step motor 70 is connected to each pair of front and rear rollers 68 so as to rotate the same. Therefore, when the step motor 70 is energized and the spacer 10 is interposed between the front and rear rollers 68, the spacer 10 is downwardly vertically moved by the rotation thereof.

Figure 3:
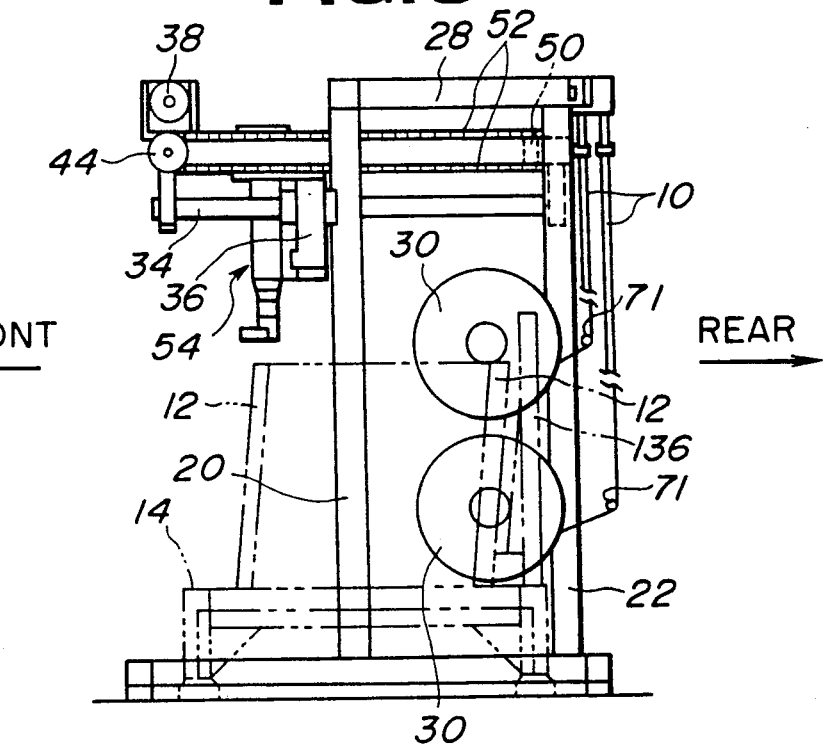
FIG. 3 is a side elevational view of the apparatus of FIG. 1.

As is seen from FIGS. 1 and 3, a plurality of idle wheels 71 are rotatably secured to the frame 16 to smoothly lead the spacer 10 from each reel 30 to each two rollers 68.

Figure 6:
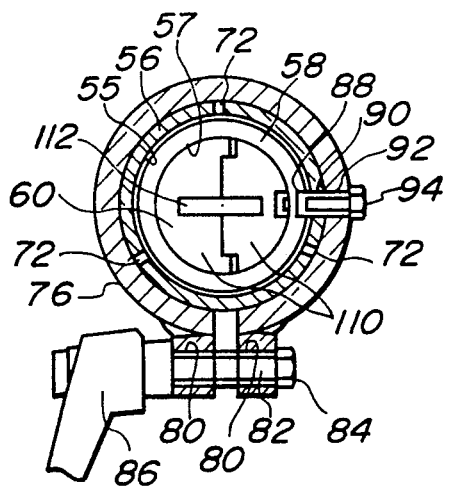
FIG. 6 is a sectional view taken along the line VI—VI of FIG. 2.
Figure 8:
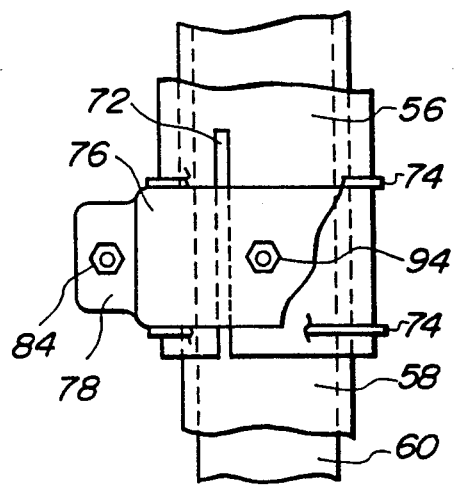
FIG. 8 is a side elevational, but partially cutaway view of an elongate member of the apparatus of FIG. 1, showing a condition in which a circular fastening band is fixed to an upper hollow portion of the elongate member.

As is seen from FIGS. 6 and 8, each upper hollow portion 56 has at its lower end portion three slits 72 formed therein which are vertically extended at regular intervals therebetween and at its lower end portion two horizontal grooves (not shown) which are positioned away from each other and formed on the side surface thereof. Two holders 74 which are generally C-shaped are respectively tightly received in the grooves and project horizontally outwardly from the lower end portion of the upper hollow portion 56.

A generally circular fastening band 76 is tightly interposed between the holders 74 and thus fixed to the upper hollow portion 56. The circular fastening band 76 has two opposed vertical flat portions 78 which have aligned circular openings 80. A bolt 82 passes through the openings and engages with a nut 84. When the bolt 82 is not engaged with the nut 84, the opposed portions 78 of the circular fastening band 76 are positioned away from each other. Upon this, when the bolt 82 is engaged with the nut 84 and tightened, the distance between the opposed portions 78 are narrowed. With this, the lower end portion of the upper hollow portion 56 is easily pressed inwardly due to the provision of the slits 72. Therefore, when the bolt 82 is tightened to have a certain tightness, the middle cylindrical portion 58 is fixed to the upper hollow portion 56 so as not to be vertically slidable. The circular fastening band 76 has a handle 86 (partially shown) secured to the bolt 82 for quickly tighten or loosen the bolt 82.

As is seen from FIG. 6, the middle cylindrical portion 58 has a vertically extended groove 88 formed on an outer surface thereof. The upper hollow portion 56 has a circular through hole 90 formed therein. The circular fastening band 76 has a circular through hole 92 formed therein which is positioned in such a manner that, when the band 76 is properly fixed to the upper hollow portion 56, the hole 92 of the band 76 is aligned with the hole 90 of the upper hollow portion 56. A bolt 94 is received in the hole 92 of the band 76, the hole 90 of the upper hollow portion 56 and the groove 88 of the middle cylindrical portion 58. Therefore, when the bolt 82 of the circular fastening band 76 is loosened, the middle cylindrical portion 58 is non-rotatably and vertically slidably connected to the upper hollow portion 56.

A circular fastening band 96 which is substantially similar to the circular fastening band 76 is fixed to a lower end portion of the middle cylindrical portion 58 in the same way as the circular fastening band 76 is, so that the lower cylindrical portion 60 can be fixed to the middle cylindrical portion 58. In fact, as is seen from FIG. 7, each middle cylindrical portion 58 has at its lower end portion three slits 98 which are substantially similar to the slits 72 of the upper hollow portion 56. The lower cylindrical portion 60 has a vertically extended groove 100. The middle cylindrical portion 58 and the circular band 96 have respective circular through holes 102 and 104 in the same way as the upper hollow portion 56 and the circular band 76 have. A bolt 106 is received in the respective holes 104 and 102 of the band and the middle cylindrical portion and the groove 100 of the lower cylindrical portion 60. Thus, when a bolt 108 of the circular fastening band 96 is loosened, the lower cylindrical portion 60 is non-rotatably and vertically slidably connected to the middle cylindrical portion 58 in the same way as the middle cylindrical portion 58 is connected to the upper hollow portion 56.

Figure 7:
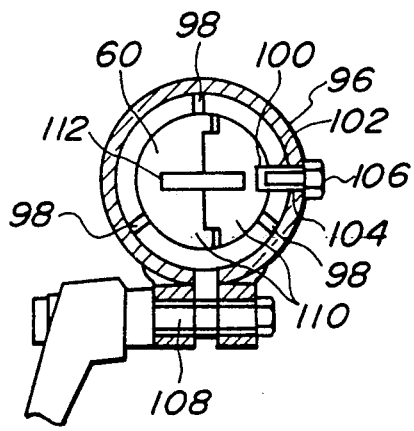
FIG. 7 is a sectional view taken along the line VII—VII of FIG. 2.

As is seen from FIGS. 6 and 7, the lower cylindrical portion 60 of the elongate member 54 is formed with two solid semi-cylindrical portions 110. The semi-cylindrical portions 110 are fixed to each other by embedded bolts (not shown). The lower cylindrical portion 60 has a rectangular slit 112 formed therein which is extended from a top surface to a bottom surface thereof and so sized as to receive the spacer 10 therein. When the middle and lower cylindrical portions 58 and 60 are non-rotatably fixed to the upper hollow portion 56 by means of the bolts 94 and 106, the slit 112 of the lower cylindrical portion 110 is positioned in such a manner that, when the spacer 10 is vertically lowered by the rollers 68, the spacer 10 is precisely inserted into the slit 112 without having any distortion thereof.

If desired, instead of using the bolts 94 and 106, the lower and middle cylindrical portions 60 and 58 and upper hollow portion 56 may be formed with key ways to receive keys.

As is seen from FIG. 1, a cutting device 114 for cutting the spacer 10 is secured to a lower end of each lower cylindrical portion 60.

Figure 5:
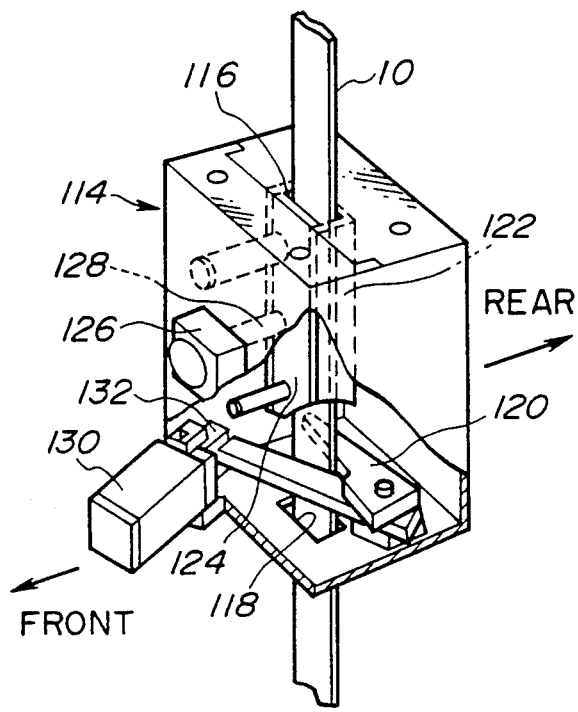
FIG. 5 is a perspective, but partially cutaway view of a cutting device of the apparatus of FIG. 1.

As is seen from FIG. 5, the cutting device 114 is rectangular in shape and has front, rear, upper and bottom wall portions and opposed side wall portions (no numerals). The upper and bottom wall portions have respectively rectangular openings 116 and 118 which are vertically aligned with each other for permitting the passage of the spacer 10 through the cutting device 114. Each opening 116 or 118 has a width defined in a lateral direction which is slightly larger than that of the spacer 10 and a length in a fore-and-aft direction which is much larger than the thickness of the spacer 10 for the purpose which will be clarified hereinafter. The cutting device 114 has a so-called scissors-like portion 120 mounted on the top surface of the bottom wall for cutting the spacer 10. A guide portion 122 extends vertically from the opening 116 of the upper wall portion to a position just above the scissors-like portion 120. The guide portion 122 includes a rear wall portion (no numeral) and opposed side wall portions (no numerals) constituting a vertical channel structure. The openings 116 and 118 of the cutting device 114 are aligned with the slit 112 of the lower cylindrical portion 60 in such a manner that the rear edges of the upper and lower openings 116 and 118 and the rear wall portion of the guide portion 122 are aligned with a rear vertical wall of the slit 112 of the lower cylindrical portion 60. That is, when the spacer 10 is lowered from the slit 10 of the lower cylindrical portion 60, the spacer 10 is vertically slid on the rear wall portion of the guide portion 122. The cutting device 114 has a pressing plate 124 for pressing the spacer 10 against the rear wall of the guide portion 122. The plate 124 extends from the top surface of the upper wall to a position just above the scissors-like portion 120 so as to be horizontally aligned with rear wall of the guide portion 122. The pressing plate 124 is received in the guide portion 122 so as to be horizontally slidable therein.

A cylinder 126 is secured to a front surface of the front wall portion of the cutting device 114 and has a piston 128 secured to a front surface of the pressing plate 124. By energizing the cylinder 126, the pressing plate 124 is slid in the guide portion 122 in a fore-and-aft direction so as to press the spacer 10 against the rear wall of the guide portion 122.

Two guiding pins are secured to the front wall portion of the cutting device 114 and the front surface of the pressing plate 124. The guiding pins makes the pressing plate 124 smoothly move in the guide portion.

A cylinder 130 is secured to the front surface of the front wall portion of the cutting device 114 and positioned below the cylinder 126. The cylinder 130 has a piston 132 secured to a front blade (no numeral) of the scissors-like portion 120. The front blade is moved in a fore-and-aft direction by energizing the cylinder 130 so as to cut the spacer 10.

In the following, operation of the apparatus will be described. The description will be commenced with respect to a condition wherein the supporting plate 36 assumes its frontmost position which is shown in FIG. 1.

Figure 2:
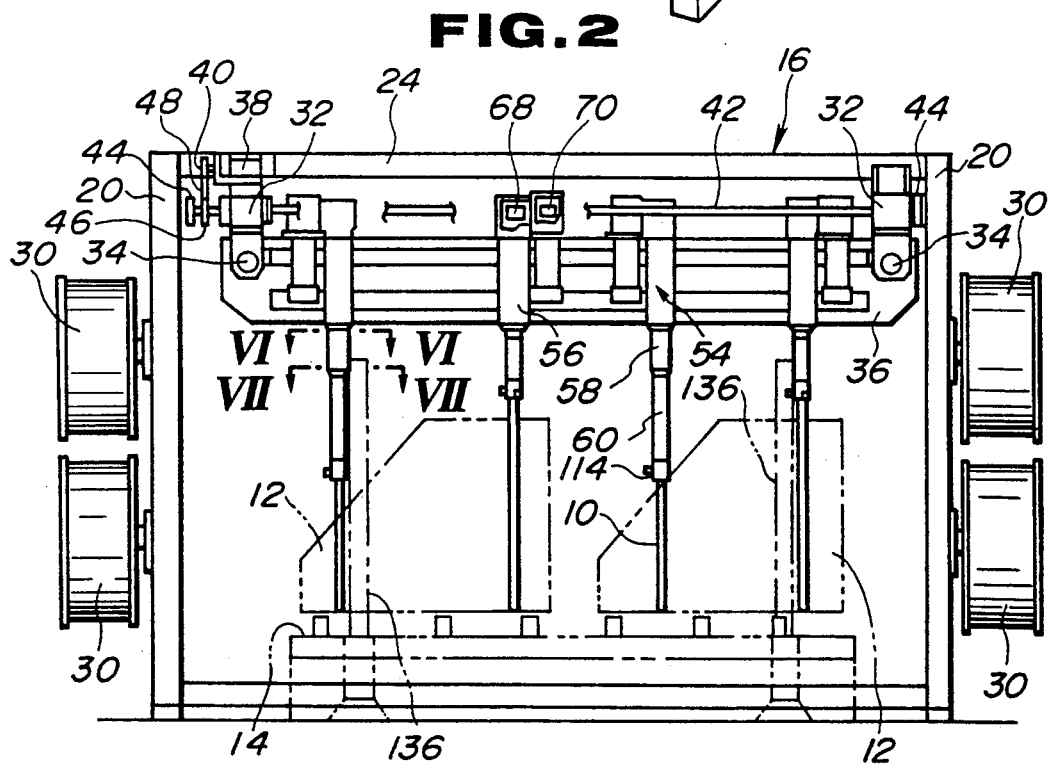
FIG. 2 is a front elevational view of the apparatus of FIG. 1, showing a condition in which the lengths of each elongate member and each spacer are varied to conform to the shape and the size of the glass plates.

Under this condition, as is seen from FIGS. 2 and 3, an empty pallet 14 for carrying the glass plates 12 is placed at a predetermined position in the frame 16. The pallet 14 has rear upright supporting members 136 against which the glass plates 12 are stood so that the glass plates 12 are slightly inclined rearwardly (see FIG. 3). Then, the elongate members 54 are slid in a lateral direction to desired positions depending on the size and the shape of the glass plates 12. After positioning the elongate members 54 at the desired positions, the elongate members 54 are fixed to the supporting plate 36 by the fixing devices 66. Then, depending on the shape and the size of the glass plates 12, the length of each elongate member 54 is varied by vertically sliding the lower and middle cylindrical portions 60 and 58. Then, the lower and middle cylindrical portions 60 and 58 are respectively fixed to the middle cylindrical portion 58 and the upper hollow portion two 56 by the two bands 96 and 76. With this, as is clearly shown in FIG. 2, the lower end of each elongate member 54 is positioned somewhat higher than the top surface of the glass plate 12.

Before the spacer 10 is received in the cutting device 114, the pressing plate 124 is kept at its frontmost position for permitting the spacer 10 to be inserted into the opening 116 of the cutting device 114. Furthermore, two blades of the scissors-like portion 120 are kept open to cut the spacer 10.

Under this condition, the step motor 38 is energized to give the drive shaft a counterclockwise rotation viewed from the step motor 38, thereby rearwardly moving the supporting plate 36. When the supporting plate 36 comes to a desired position, the step motor 38 is deenergized. Then, the spacer 10 is pulled out of the reel 30 and engaged with the idle wheels 71. Then, an end portion of the spacer 10 is inserted between the two rollers 68 and into the elongate member 54 and lowered to a position between the two blades of the scissors-like portion 120.

A first glass plate 12 is moved to a predetermined position in the pallet 14 by a robotic arm (not shown) so as to be stood against the supporting member 136 of the pallet 14. Under this condition, a front surface of a vertical portion of the spacer 10 is vertically aligned with a rear edge of a top surface of the first glass plate 12.

As the robotic arm forwardly moves away from the frame 16 after standing the glass plate 12 against the supporting member 136 of the pallet 14, the step motor 38 is energized for a predetermined time to give the drive shaft a clockwise rotation viewed from the step motor 38 so as to forwardly move the supporting plate 36 by the distance which is the same as the total thicknesses of the first glass plate 12 and the spacer 10. After the supporting plate 36 is moved by this distance, the step motor 38 is deenergized. The rotation angle of the drive shaft is precisely controlled by a predetermined pulse rate so as to precisely move the supporting plate 36 by the distance.

As the movement of the supporting plate 36 is stopped, each step motor 70 is energized for a predetermined time. With this, the spacer 10 is lowered vertically until the lower end of the spacer abuts against an upper end of a front surface of the first glass plate 12 and then is lowered until the lower end of the spacer 10 reaches the lower end of the front surface of the first glass plate 12 in a manner to slide on the front surface of the first glass plate 12 which is slightly rearwardly inclined. Then, a second glass plate 12 is moved from the front toward the first glass plate 12 so as to mate with the first glass plate 12 and to interpose the spacer therebetween. Then, the cylinder 126 of the cutting device 114 is energized to rearwardly move the pressing plate 124 to press the spacer 10 against the rear wall of the guiding portion 122. Then, the cylinder 130 is energized to rearwardly push the front blade of the scissors-like portion 120 so as to cut the spacer 10. Upon cutting, the spacer 10 is fixed by the pressing plate 124. Therefore, the spacer 10 is neatly cut by the scissors-like portion 120. A cut portion of each spacer 10 is interposed and tightly held between the first and second glass plates 12. Then, the pressing plate 124 and the front blade are moved to their initial frontmost positions. Then, depending on the total number of the glass plates to be carried in one pallet 14, the above-mentioned operation is continued until the spacers 10 are interposed between adjacent glass plates 12.

The advantages of the apparatus of the present invention will be described in the following.

If desired, a control circuit can be provided to control the movements of the step motors 38 and 70 and the robotic arm, so that it is made possible to automatically place the glass plates 12 in one pallet 14 and to automatically interpose the spacers 10 between adjacent glass plates 12.

If desired, depending on the size of the glass plates 12 and the capacity of the robotic arm to carry the plates 12 at one time, a plurality of glass plates 12 (two in FIG. 2) which are abreast arranged can be placed in a pallet at the same time. This can reduce the time necessary for interposing the spacers 10 between the plates 12.

In the above-mentioned embodiment, the glass plates 12 are used for interposing the spacers 10 therebetween. However, the apparatus can interpose the spacers 10 between other plates besides the glass plates 12.

For example, a tape made of polypropylene which is relatively cheap can be used for the spacer 10, thereby lowering the production cost.

The length of each spacer 10 to be interposed between the adjoining plates can be easily and precisely varied to conform to the shape and the size of the glass plate because of the provision of the step motor 70.

What is claimed is:

1. An apparatus for interposing a spacer between adjacent plates of a plurality of plates which are to be generally vertically stood on a pallet so as to be horizontally in alignment in a predetermined direction, said apparatus comprising:
    a frame which receives the pallet therein;
    a supporting member which is operatively connected to said frame so as to be horizontally slidable in the predetermined direction with respect to said frame, said supporting member being positioned at a level which is higher than the plates which are generally vertically stood on the pallet;
    an essentially vertical elongate member connected to said supporting member, said elongate member having an axially extending opening formed therein in which the spacer can be received;

axially extending means for guiding the spacer into the first opening and lowering the spacer to a position adjacent a major surface of a first plate which is generally vertically stood on the pallet, said first means being mounted on a top of said elongate member;

second means for placing a second plate on the pallet and moving the second plate to a first predetermined position with respect to the first plate wherein the spacer is sandwiched between the first and second plates; and third means for cutting the spacer, said third means being secured to a lower end of said elongate member.

2. An apparatus as claimed in claim 1, in which said elongate member is vertically telescopic, and in which said cutting means is adjustable to be positioned at a level which is higher than the plates which are generally vertically stood on the pallet.

3. An apparatus as claimed in claim 1, in which said elongate member is connected to said supporting member so as to be horizontally slidable in a direction perpendicular to the predetermined direction.

4. An apparatus as claimed in claim 1, in which the spacer is made of materials windable around a reel which is rotatably secured to said frame.

5. An apparatus as claimed in claim 1, further comprising a first driving means for sliding said supporting member.

6. An apparatus as claimed in claim 5, in which said first driving means comprises a first step motor which is secured to said frame and operatively connected to said supporting member.

7. An apparatus as claimed in claim 6, further comprising a mechanism arranged between said first step motor and said supporting member, said mechanism comprising:

a drive shaft extending from said first step motor;

a first timing-belt pulley rotatably secured to said frame and operatively connected to said drive shaft;

a second timing-belt pulley rotatably secured to said frame, said second timing-belt pulley being horizontally in alignment with said first timing-belt pulley along the predetermined direction; and an endless timing belt which operatively connects said first timing-belt pulley to said second timing-belt pulley, said endless timing belt being secured to said supporting member so as to slide said supporting member in the predetermined direction.

8. An apparatus as claimed in claim 1, in which said first means comprises a pair of rollers rotatably secured to said elongate member so as to interpose said spacer therebetween and to vertically lower said spacer.

9. An apparatus as claimed in claim 8, further comprising a second driving means for rotating said rollers.

10. An apparatus as claimed in claim 9, in which said second driving means comprises a second step motor secured to said elongate member and operatively connected to said rollers.

11. An apparatus as claimed in claim 1, in which said third means has a vertical and rectangular through opening for receiving the spacer therein, and in which said third means has a so-called scissors-like portion having two blades for cutting the spacer, said scissors-like portion being positioned so as to cut the spacer received in the vertical and rectangular through opening.

12. An apparatus as claimed in claim 11, in which said third means has a vertically extending channel portion for receiving the spacer therein, said portion having a first vertical wall and opposed vertical walls extending from both ends of the first vertical wall, said portion being positioned above said scissors-like portion, and in which said third means has a second vertical wall which is slidable in said portion and movable toward and away from the first vertical wall so as to press the spacer against the first vertical wall.

13. An apparatus as claimed in claim 1, in which said second means comprises a robotic arm.

14. A method for interposing a spacer between adjacent plates of a plurality of plates which are to be generally vertically stood on a pallet so as to be horizontally in alignment in a predetermined direction, said method comprising the following steps in the sequence set forth:

(1) placing a first plate on the pallet and vertically standing the same on the pallet;

(2) placing the spacer at a first position above a top of the first plate;

(3) lowering the spacer from the first position to a position wherein the spacer is in abutment with a major surface of the first plate;

(4) placing a second plate on the pallet and moving the second plate to a second position with respect to the first plate wherein the spacer is sandwiched between the first and second plates;

(5) cutting the spacer at a position above the top of the first plate; and (6) placing the spacer at a third position which is positioned away from the first position by a distance which is the sum of the thickness of the second plate and the thickness of the spacer.

* * * * *